United States Patent
Son

(10) Patent No.: US 10,244,212 B2
(45) Date of Patent: Mar. 26, 2019

(54) ELECTRONIC DEVICE AND METHOD FOR CONTROLLING THEREOF FOR REDUCING POWER CONSUMPTION IN A STANDBY MODE

(71) Applicant: Samsung Electronics Co., Ltd., Suwon-si, Gyeonggi-do (KR)

(72) Inventor: Sung-ki Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/819,396

(22) Filed: Nov. 21, 2017

(65) Prior Publication Data

US 2018/0146173 A1 May 24, 2018

(30) Foreign Application Priority Data

Nov. 22, 2016 (KR) ........................ 10-2016-0155736

(51) Int. Cl.
| | | |
|---|---|---|
| *H04N 1/00* | (2006.01) | |
| *H04N 7/22* | (2006.01) | |
| *H04N 5/38* | (2006.01) | |
| *H04N 5/63* | (2006.01) | |

(52) U.S. Cl.
CPC .......... *H04N 7/22* (2013.01); *H04N 1/00111* (2013.01); *H04N 5/38* (2013.01); *H04N 5/63* (2013.01); *H04N 2201/0053* (2013.01)

(58) Field of Classification Search
CPC ................................................ H04N 1/00111
See application file for complete search history.

(56) References Cited

U.S. PATENT DOCUMENTS

| | | | | |
|---|---|---|---|---|
| 6,051,967 A | * | 4/2000 | Draaijer | G01R 29/08 |
| | | | | 324/452 |
| 6,334,012 B1 | * | 12/2001 | Yoon | G02B 6/4201 |
| | | | | 385/24 |

(Continued)

FOREIGN PATENT DOCUMENTS

| | | |
|---|---|---|
| JP | 11-112423 | 4/1999 |
| JP | 2002-252368 | 9/2002 |

(Continued)

OTHER PUBLICATIONS

International Search Report, PCT/ISA/210, dated Feb. 13, 2018, in corresponding International Patent Application No. PCT/KR2017/013177.

(Continued)

*Primary Examiner* — Paulos M Natnael
(74) *Attorney, Agent, or Firm* — Staas & Halsey LLP

(57) ABSTRACT

An electronic device includes an amplifier, a signal conversion unit configured to include at least one photodiode, in response to an optical signal being received from an external device, convert the received optical signal into an electric signal by using the at least one photodiode and output the electric signal, and a processor configured to control to supply power to the amplifier in response to the electric signal being received from the signal conversion unit, wherein the amplifier, in response to the power being supplied, receives the electric signal from the signal conversion unit, amplifies the received electric signal and outputs the amplified electric signal to the processor.

7 Claims, 9 Drawing Sheets

(56) References Cited

U.S. PATENT DOCUMENTS

| | | | |
|---|---|---|---|
| 6,737,623 B2* | 5/2004 | Suzunaga | H03K 17/94 250/206 |
| 7,751,715 B2* | 7/2010 | Takami | H04B 10/6931 398/115 |
| 7,787,780 B2* | 8/2010 | Suzunaga | H03F 3/08 250/214 A |
| 9,299,731 B1* | 3/2016 | Lenius | G01S 17/06 |
| 2003/0034963 A1 | 2/2003 | Moon et al. | |
| 2003/0202171 A1* | 10/2003 | Kennedy | G01M 11/337 356/73.1 |
| 2004/0126118 A1 | 7/2004 | Lo et al. | |
| 2007/0286601 A1* | 12/2007 | Takami | H03G 3/3084 398/45 |
| 2008/0265133 A1 | 10/2008 | Sawtell et al. | |
| 2012/0273659 A1* | 11/2012 | Maki | H03F 3/087 250/214 A |
| 2014/0376924 A1* | 12/2014 | Konchitsky | H04B 10/50 398/182 |
| 2017/0366277 A1* | 12/2017 | Ban | H04B 10/697 |
| 2018/0006728 A1* | 1/2018 | Yuda | H04B 10/58 |

FOREIGN PATENT DOCUMENTS

| | | |
|---|---|---|
| JP | 2004-200399 | 7/2004 |
| KR | 1993-0006994 | 4/1993 |
| KR | 1998-0063631 | 10/1998 |
| KR | 1998-007785 | 11/1998 |
| KR | 1998-0077858 | 11/1998 |
| KR | 10-2006-0011338 | 2/2006 |
| WO | WO 2014/000707 A1 | 1/2014 |

OTHER PUBLICATIONS

International Written Opinion, PCT/ISA/237, dated Feb. 13, 2018, in corresponding International Patent Application No. PCT/KR2017/013177.

* cited by examiner

ELECTRONIC DEVICE AND METHOD FOR CONTROLLING THEREOF FOR REDUCING POWER CONSUMPTION IN A STANDBY MODE

CROSS-REFERENCE TO RELATED APPLICATIONS

This application claims priority from Korean Patent Application No. 10-2016-0155736, filed on Nov. 22, 2016, in the Korean Intellectual Property Office, the disclosure of which is incorporated herein by reference in its entirety.

BACKGROUND

1. Field

Devices and methods consistent with what is disclosed herein relate to an electronic device and a method for controlling thereof, and more particularly, to an electronic device including a photodiode and a method for controlling thereof.

2. Description of the Related Art

Recently, with the development of electronic technology, various electronic devices such as a TV, a computer, a notebook, etc. have been developed and such electronic devices are being used while being connected to various external devices for satisfying the detailed demands of consumers. For example, display devices such as a TV, etc. are being used while being connected to a set-top box, a Blue ray player, etc.

As an electronic device is used in connection with various external devices, a need for the electronic device to efficiently receive and process a signal transmitted from external devices arises.

For this purpose, optical communication where a light signal is received and transmitted through light fibers is recently used. However, there arises a problem of redundant power consumption since an electronic device should be in a standby state while providing power to all of the components for receiving and processing an optical signal to receive the optical signal from an external device and process the optical signal.

Accordingly, a demand for an electronic device for reducing redundant power consumption in a standby mode for receiving an optical signal arises.

SUMMARY

An aspect of the exemplary embodiments relates to providing an electronic device for reducing power consumption in a standby mode and a method for controlling thereof.

According to an exemplary embodiment, there is provided an electronic device including an amplifier, a signal conversion unit configured to include at least one photodiode, in response to an optical signal being received from an external device, convert the received optical signal into an electric signal by using the at least one photodiode and output the electric signal, and a processor configured to control to supply power to the amplifier in response to the electric signal being received from the signal conversion unit, wherein the amplifier, in response to the power being supplied, receives the electric signal from the signal conversion unit, amplifies the received electric signal and outputs the amplified electric signal to the processor.

The signal conversion unit may include a first photodiode configured to be connected to the processor and output the electric signal to the processor, and a second photodiode configured to be connected to the amplifier and output the electric signal to the amplifier to which the power is supplied.

The electronic device may further include a display, wherein the processor processes an electric signal received from the amplifier and outputs an image on the display.

The electronic device may be connected to the external device through a transparent optical cable for transmitting the optical signal.

The external device may include a first laser photodiode configured to convert a signal received from another external device connected to the external device into an optical signal and transmit the optical signal to the first photodiode, and a second laser photodiode configured to convert a signal received from another external device connected to the external device into an optical signal and transmit the optical signal to the second photodiode.

The external device may be a jack pack device which is connected to a plurality of other external devices, convert signals received from the plurality of other external devices into optical signals and transmit the optical signals to the electronic device through a single cable.

The signal conversion unit may include a single photodiode including two pins for outputting the electric signal, wherein a first pin of the single photodiode is connected to the processor and outputs the electric signal to the processor, and wherein a second pin of the single photodiode is connected to the amplifier and outputs the electric signal to the amplifier to which the power is supplied.

The electronic device may further include a display, wherein the processor processes an electric signal received from the amplifier and outputs an image on the display.

The electronic device may be connected to the external device through a transparent optical cable for transmitting the optical signal.

The external device may include a laser photodiode which converts a signal received from another external device connected to the external device into an optical signal and transmits the optical signal to the photodiode.

The external device may be a jack pack device which is connected to a plurality of other external devices, convert signals received from the plurality of other external devices into optical signals and transmit the optical signals to the electronic device through a single cable.

According to an exemplary embodiment, there is provided a method for controlling an electronic device including converting an optical signal received from an external device into an electric signal and outputting the electric signal by a signal conversion unit, supplying power to an amplifier in response to the electric signal being output from the signal conversion unit, and receiving the electric signal output from the signal conversion unit and amplifying and outputting the received electric signal by the amplifier to which the power is supplied.

According to the above-described various exemplary embodiments, redundant power consumption may be reduced in a standby mode for receiving an optical signal.

DETAILED DESCRIPTION OF EXEMPLARY EMBODIMENTS

The terms used in the present disclosure and the claims are general terms selected in consideration of the functions of the various example embodiments of the present disclosure. However, such terms may be varied depending on an intention of those skilled in the art, a legal or technical interpretation, an emergence of a new technology, and the like. Also, there may be some terms arbitrarily selected by an applicant. Such terms may be construed according to meanings defined in the present specification, and may also be construed based on general contents of the present specification and a typical technical concept in the art unless the terms are not specifically defined.

In describing example embodiments, detailed description of relevant known functions or components may be omitted if it would obscure the description of the subject matter.

Furthermore, embodiments of the present disclosure will be described in detail with reference to the accompanying drawings. However, we note that the present invention may be embodied in different other forms and should not be construed as being limited only to the embodiments set forth herein.

Referring to the attached drawings, the EMI shielding structures according to exemplary embodiments will be described in detail below.

Figure 1:
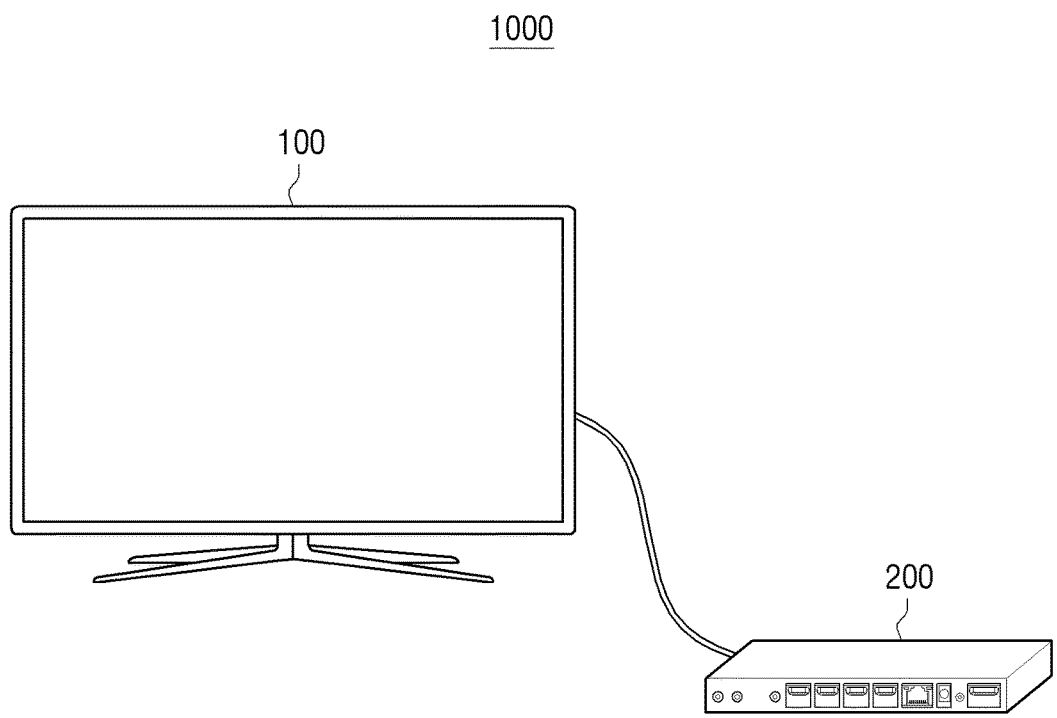
FIG. 1 is a view provided to explain an electronic system according to an exemplary embodiment.

FIG. 1 is a view provided to explain an electronic system according to an exemplary embodiment.

As shown in FIG. 1, an electronic system 1000 may include an electronic device 100 and an external device 200.

The electronic device 100 may be connected to the external device 200.

For example, the electronic device 100 may be connected to the external device 200 through a cable. The cable may be an optical cable formed of a bunch of optical fibers consisting of inner glass (core) having a large refractive index and outer glass (cladding) having a small refractive index. Therefore, the electronic device 100 and the external device 200 may simultaneously transmit and receive a large amount of data without interruption due to an external wavelength compared to telecommunication where an electronic signal is received and transmitted by using a copper wire.

In addition, the optical cable may be a transparent optical cable formed of transparent materials. An outer cover of the optical cable may be embodied with a transparent material, for example, a transparent plastic material. In addition, the inside of the outer cover may be coated with an inner cover material for reducing an interference effect caused by natural light. Therefore, the electronic device 100 and the external device 200 may be connected to each other without destroying visual aesthetic sense unlike conventional opaque cables.

The external device 200 may be a Jack Pack device where an audio and video jack (A/V Jack) is manufactured in a Pack type. When the electronic device 100 is embodied in a ceiling hanger type to be installed from the ceiling or a wall-mounted type to be fixed at the wall as a PDP-TV, the jack pack device may be separately manufactured from the PDP-TV to eliminate difficulty of A/V cable connection due to the A/V jack being located on a rear surface of the device. However, the present invention is not limited thereto. The external device 200 may be various types of devices connected to the electronic device 100 through a cable for transmitting and receiving various kinds of data, for example, a set-top box, a Blu-Ray Player, etc.

The external device 200 may transmit an optical signal to the electronic device 100 through an optical cable.

Specifically, when the external device 200 is embodied as the jack pack device, the external device 200 may convert a signal received from another external device (not shown) connected thereto into an optical signal and transmit the optical signal to the electronic device 100 through the optical cable.

The electronic device 100 may be various types of display devices such as a TV, a computer, a notebook, etc. However, the present invention is not limited thereto, but it should be understood that the electronic device 100 may be various types of devices that are connected to the external device 200 through a cable and transmit and receive various kinds of data.

The electronic device 100 may receive and process the optical signal transmitted from the external device 200 through the optical cable.

To this end, the electronic device 100 may include a signal conversion unit, an amplifier and a processor. The detailed description of how the electronic device 100 receives and processes an optical signal will be made with reference to drawings below.

Figure 2:
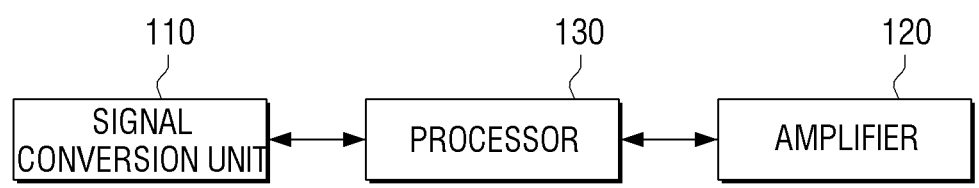
FIG. 2 is a block diagram provided to explain configuration of an electronic device according to an exemplary embodiment.

FIG. 2 is a block diagram provided to explain configuration of an electronic device according to an exemplary embodiment.

Referring to FIG. 2, the electronic device 100 may include a signal conversion unit 110, an amplifier 120 and processor 130.

The signal conversion unit 110 may convert an optical signal received from the external device 200 into an electric signal. The signal conversion unit 110 may include at least one photodiode.

The at least one photodiode included in the signal conversion unit 110 may convert an optical signal into an electric signal by using a phenomenon of generating an electromotive force when a PN junction unit of a semiconductor is irradiated with light. To this end, a light extraction property which serves as an optical sensor to a PN semiconductor may be added to the photodiode. However, the present invention is not limited thereto, but the photodiode may have a structure that uses a photovoltaic effect of a Schottky diode of metal-semiconductor contact in replace of PN junction, or a pin photodiode structure where an i layer is interposed between a P layer and an N layer.

In addition, the signal conversion unit 110 may transmit the converted electric signal to the processor 130. For this, the signal conversion unit 110 may be connected to the processor 130 on a printed circuit board (PCB) through a PCB pattern. The PCB pattern may refer to a portion formed of a conductive material so that a current may flow through on the PCB.

In addition, the signal conversion unit 110 may transmit the converted electric signal to the amplifier 120. For this, the signal conversion unit 110 may be connected to the amplifier 120 on the PCB through the PCB pattern.

The amplifier 120 may be connected to the signal conversion unit 110, and in response to the electric signal being received from the signal conversion unit 110, amplify the received electric signal.

To this end, the amplifier 120 may be embodied as a Trans-Impedance Amplifier (TIA).

The trans-impedance amplifier may refer to an amplifier which converts a current signal, which is provided as an input, into a voltage signal by using a convey impedance, amplifies the voltage signal and outputs the amplified voltage signal. Specifically, when the signal conversion unit 110 converts an optical signal into a current signal and transmits the current signal, the trans-impedance amplifier may convert the current signal into the voltage signal and amplify the voltage signal. Accordingly, the trans-impedance amplifier may convert an output current signal output from the signal conversion unit 110 into the voltage signal and amplify an amplitude of the voltage signal.

Figure 4:
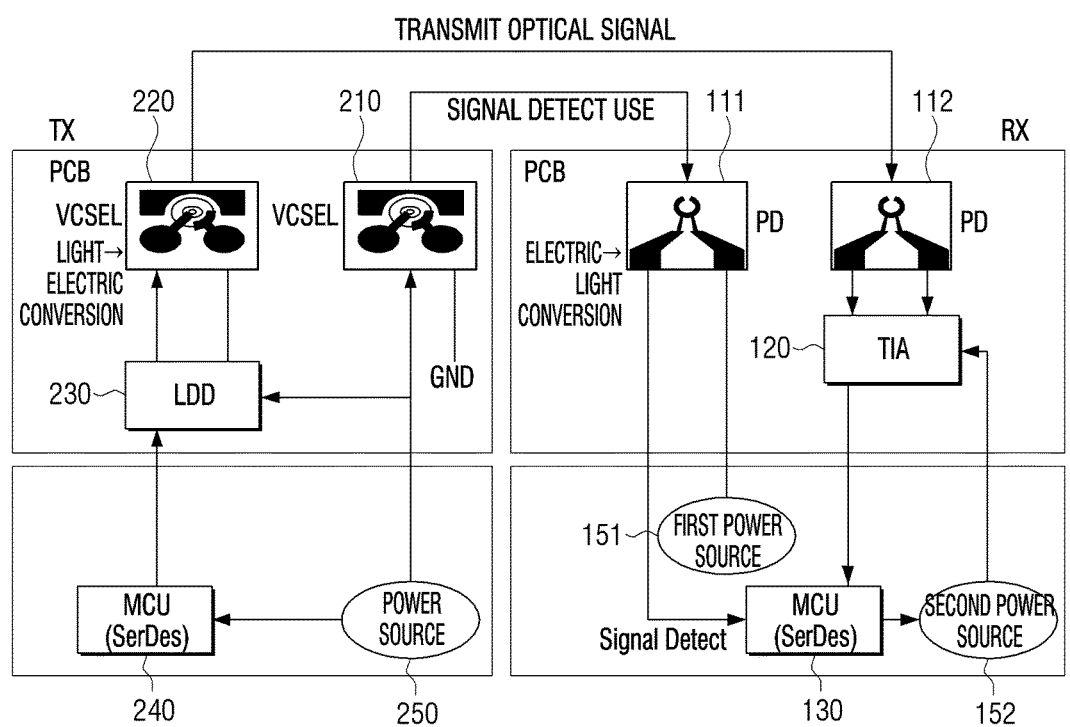
FIG. 4 is a view provided to explain a method for receiving, transmitting and processing an optical signal according to an exemplary embodiment.

Meanwhile, as shown in FIG. 4, the amplifier 120 may be connected to a second power source 152 in the electronic device 100. The second power source 152 may supply a voltage required for driving the amplifier 120, the amplifier 120 may not amplify and output a signal output from the signal conversion unit 110 when the second power source 152 is turned off.

The processor 130 may control overall operations of the electronic device 100.

To this end, the processor 130 may include a Central Processing Unit (CPU), a Random Access Memory (RAM), and a Read Only Memory (ROM) and perform calculations and data processing related to controlling other constituents included in the electronic device 100. For example, the processor 130 may be embodied as a Micro Controller Unit (MCU).

The processor 130 may receive the electric signal from the signal conversion unit 110.

The second power source 152 may not be supplied to the amplifier 120. That is, the amplifier 120 may not amplify the electric signal output from the signal conversion unit 110 and output the electric signal to the processor 130.

As such, the electronic device 100 may not supply power to the amplifier 120 in a standby mode for receiving an optical signal, thereby reducing redundant power consumption.

The processor 130 may control the second power source 152 of the electronic device 100 to supply power to the amplifier 120 when receiving an electric signal from the signal conversion unit 110.

Specifically, the processor 130, in response to an electric signal being received from the signal conversion unit 110, may determine that an optical signal is received from the external device 200. Accordingly, the processor 130 may control the second power source 152 to apply power to the amplifier 120 for performing signal processing of the optical signal received from the external device 200 when it is determined that the optical signal is received from the external device 200.

When a driving voltage by the second power source 152 is applied to the amplifier 120, the amplifier 120 may amplify the electric signal output from the signal conversion unit 110 and output the amplified electric signal to the processor 130. Thus, a current signal may be converted into a voltage signal, and the voltage signal may be transmitted to the processor 130 with an amplitude being amplified.

Accordingly, the processor 130 may perform a function of the electronic device 100 by using the amplified electric signal.

For example, when the electronic device 100 further includes a display (not shown), the processor 130 may output an image on the display by using the amplified electric signal.

Specifically, when the amplified electric signal is related to an image, the processor 130 may control an image processing unit (not shown) to perform image processing such as frame rate conversion, resolution conversion of image contents, and the like, and when the amplified electric signal is related to a voice, the processor 130 may control an audio processing unit (not shown) to perform audio processing such as decoding, scaling, noise filtering of voice contents, etc.

The detailed description of the case where the signal conversion unit 110 includes a first photodiode and a second photodiode and the case where the signal conversion unit 110 includes a single photodiode will be made below.

Hereinafter, the repeated description of FIG. 2 will be omitted.

Figure 3:
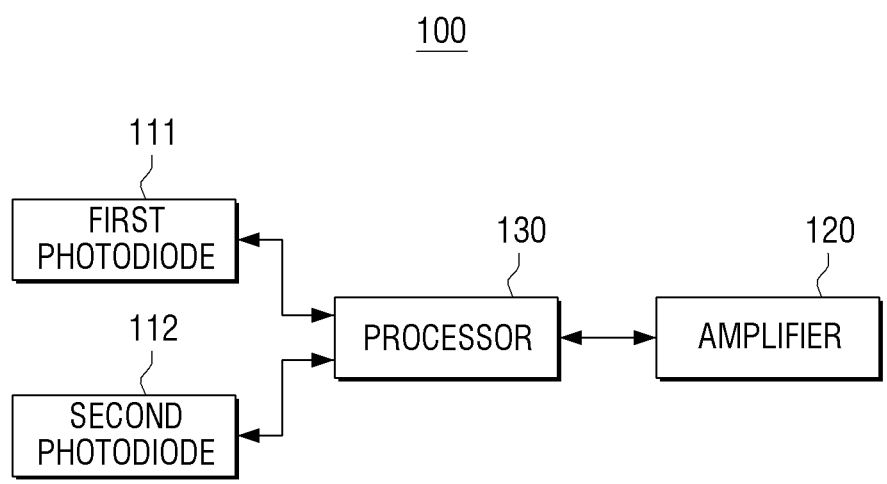
FIG. 3 is a block diagram provided to explain configuration of an electronic device when a signal conversion unit includes a first photodiode and a second photodiode according to an exemplary embodiment.

FIG. 3 is a block diagram provided to explain configuration of an electronic device when a signal conversion unit includes a first photodiode and a second photodiode according to an exemplary embodiment.

As shown in FIG. 3, the electronic device 100 may include a first photodiode 111, a second photodiode 112, an amplifier 120 and a processor 130.

Referring to FIG. 4, the first photodiode 111 may be connected to a first power source 151 of the electronic device 100. Accordingly, the first photodiode 111 may convert an optical signal received from the external device 200 into an electric signal by using power supplied from the first power source 151.

In addition, the first photodiode 111 may transmit the converted electric signal to the processor 130.

Referring to FIG. 4, the second photodiode 112 may be connected to the second power source 152 of the electronic device 100. Accordingly, the second photodiode 112 may convert the optical signal received from the external device 200 into the electric signal by using power supplied from the second power source 152 of the electronic device 100.

In addition, the second photodiode 112 may transmit the converted electric signal to the amplifier 120 when the amplifier 120 in an off state starts to be driven.

The amplifier 120 may be connected to the second photodiode 112 and in response to an electric signal being received from the second photodiode 112, amplify the received electric signal.

The processor 130 may receive an electric signal from the first photodiode 111. Specifically, the first photodiode 111, in response to the optical signal being received from the external device 200, may convert the optical signal into the electric signal and output the converted electric signal to the processor 130. Accordingly, the processor 130 may receive the electric signal from the first photodiode 111.

The second power source 152 may not be supplied to the amplifier 120. That is, the amplifier 120 may not amplify the electric signal output from the second photodiode 112 and output the electric signal to the processor 130.

When the processor 130 receives an electric signal, the processor 130 may control the second power source 152 of the electronic device 100 to supply power to the amplifier 120.

Specifically, the processor 130, in response to the electric signal being received from the first photodiode 111, may determine that the optical signal is received from the external device 200. Accordingly, the processor 130 may control the second power source 152 to apply the power to the amplifier 120 for performing signal processing of the optical signal received from the external device 200 when it is determined that the optical signal is received from the external device 200.

As such, the first photodiode 111 may serve as a signal detect in outputting the electric signal to the processor 130 to render the processor 130 to detect the optical signal received from the external device 200.

When the driving voltage by the second power source 152 is applied to the amplifier 120, the amplifier 120 may amplify the electric signal output from the second photodiode 112 and output the amplified electric signal to the processor 130. Thus, a current signal may be converted into a voltage signal and the voltage signal may be transmitted to the processor 130 with an amplitude being amplified.

Accordingly, the processor 130 may perform a function of the electronic device 100 by using the amplified electronic signal.

FIG. 4 is a view provided to explain a method for receiving, transmitting and processing an optical signal according to an exemplary embodiment.

The external device 200 may transmit the optical signal to the electronic device 100 through the optical cable.

To this end, the external device 200 may include a first laser diode 210, a second laser diode 220, a Laser Diode Driver (LDD) 230 and a Micro Controller Unit (MCU) 240. The first and second laser diodes 210 and 220 may be embodied as Vertical-Cavity Surface-Emitting Laser (VCSEL).

First, the external device 200 may receive an electric signal from another external device (not shown) connected thereto.

In addition, when detecting an electric signal, the MCU 240 may control a power source 250 connected to the first laser diode 210 and a laser diode driver 230 and supply power to the first laser diode 210 and the laser diode driver 230. Accordingly, the first laser diode 210 may convert the received electric signal into an optical signal and transmit the optical signal to the electronic device 100 through an optical cable, and the laser diode driver 230 may control the second laser diode 220. Specifically, the laser diode driver 230 may control the second laser diode 220 to convert the received electric signal into the optical signal. Accordingly, the second laser diode 220 may convert an electric signal into an optical signal and transmit the optical signal to the electronic device 100 through an optical cable.

Meanwhile, the first and second laser diodes 210 and 220, the laser diode driver 230 and the MCU 240 may transmit and receive signals by using Inter Integrated Circuit (I2C) communication. The I2C communication may refer to communication where a Serial Clock (SCL) signal is used as a synchronization signal and data is exchanged through Serial Data (SDA).

The electronic device 100 may convert an optical signal received through an optical cable into an electric signal and process the electric signal.

To this end, as described above, the electronic device 100 may include the first photodiode 111, the second photodiode 112, the amplifier 120 and the processor 130. The first photodiode 111 may be connected to the first power source 151 of the electronic device 100 and supplied with a driving voltage. Accordingly, by using the applied voltage, the first photodiode 111 may receive an optical signal through an optical cable, convert the optical signal into an electric signal, and transmit the electric signal to the processor 130.

Meanwhile, since the amplifier 120 is not supplied with the driving voltage by the second power source 152, the amplifier 120 may not be driven. Accordingly, the electric signal converted by the second photodiode 112 may not pass through the amplifier 120.

When the electric signal is transmitted from the first photodiode 111 to the processor 130, the processor 130 may detect an electric signal, control the second power source 152 connected to the amplifier 120 accordingly, and control to apply a driving voltage to the amplifier 120.

In addition, when the driving voltage by the second power source 152 is applied to the amplifier 120 and the amplifier 120 is driven accordingly, the electric signal output from the second photodiode 112 may flow through the amplifier 120. Accordingly, the processor 130 may receive the electric signal amplified by passing through the amplifier 120 from the amplifier 120.

As such, when an electric signal is not detected by the first photodiode 111, the second power source 152 provided to the amplifier 120 may be turned off, thereby reducing redundant power consumption in a standby mode of the electronic device 100.

The first and second photodiodes 111 and 112, the amplifier 120 and the processor 130 may transmit and receive signals by using the PCB pattern as described above.

In addition, above-described FIG. 4 illustrates that the electronic device 100 may include the first power source 151 and the second power source 152 as additional components, but it is for convenience of explanation. It should be understood that power may be supplied to the first photodiode 111 and the amplifier 120 through a single power source.

Figure 5:
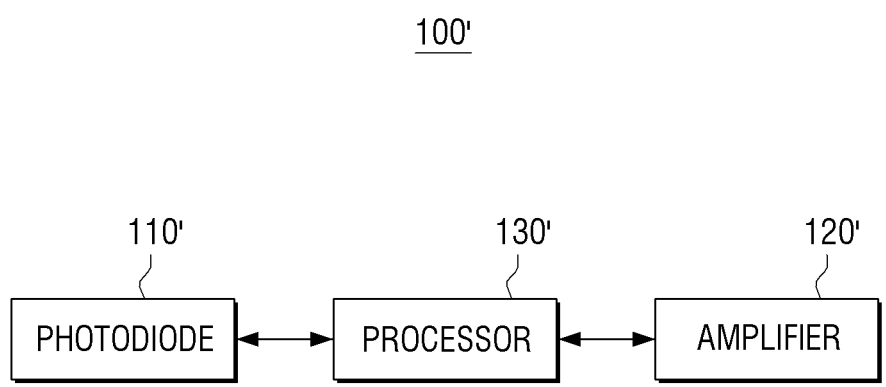
FIG. 5 is a block diagram provided to explain configuration of an electronic device when a signal conversion unit includes a single photodiode according to an exemplary embodiment.

FIG. 5 is a block diagram provided to explain configuration of an electronic device when a signal conversion unit includes a single photodiode according to an exemplary embodiment.

As shown in FIG. 5, the electronic device 100 may include a photodiode 110', an amplifier 120' and a processor 130'.

The photodiode 110' may include a plurality of pins.

Figure 6:
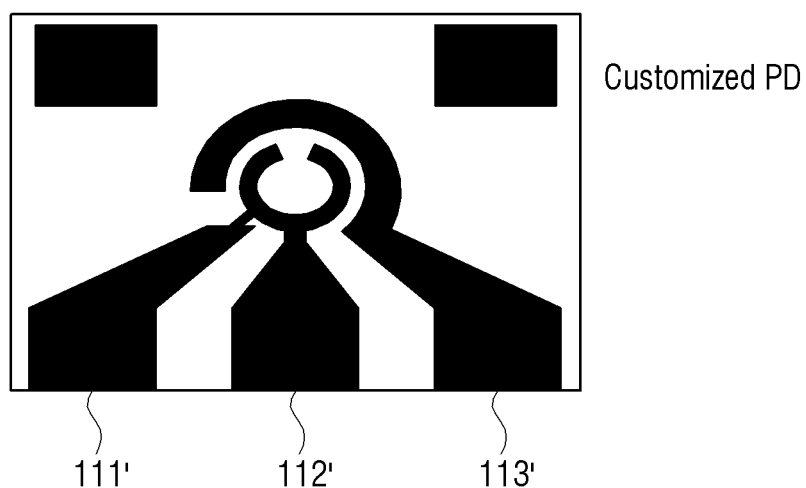
FIG. 6 is a view provided to explain configuration of a photodiode according to an exemplary embodiment.
Figure 7:
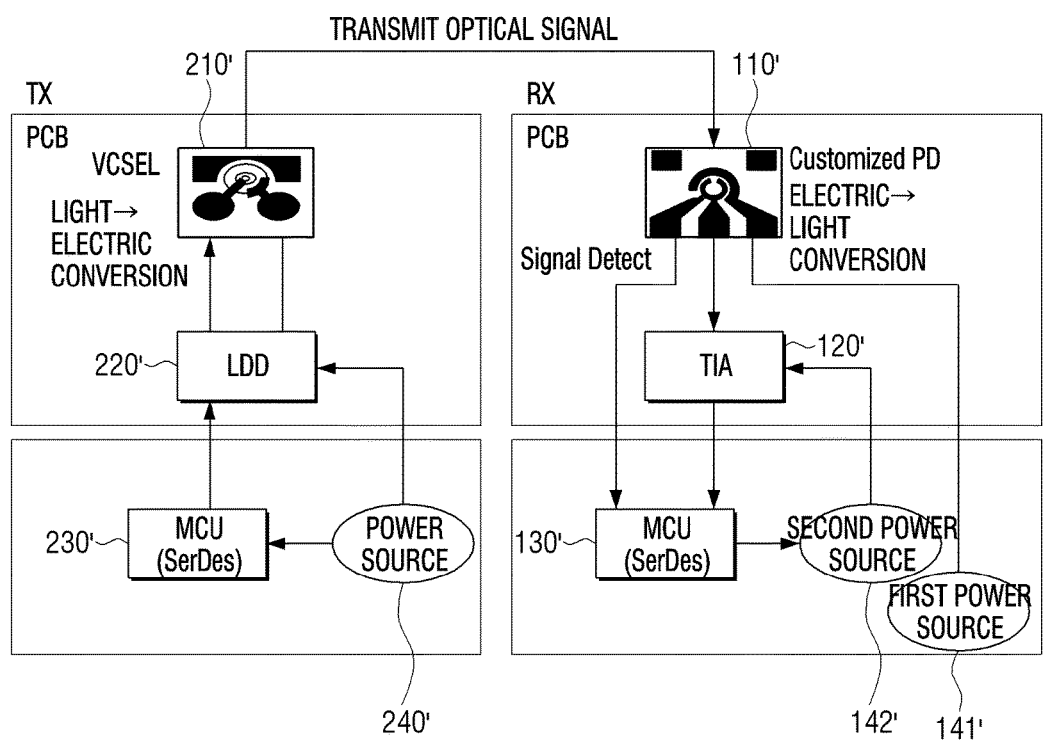
FIG. 7 is a view provided to explain a method for transmitting, receiving and processing an optical signal according to an exemplary embodiment.

Specifically, referring to FIGS. 6 and 7, the photodiode 110' may include a first pin 111' connected to the processor 130', a second pin 112' connected to the amplifier 120' and a third pint 113' connected to a first power source 141'. The first power source 141' may be disposed in the electronic device 100, connected to the third pin 113' of the photodiode 110', and supply a driving voltage to the photodiode 110'. Specifically, the first power source 141' may supply a driving voltage required for converting an optical signal which the third pin 113' of the photodiode 110' receives from the external device 200 into an electric signal and transmitting the converted electric signal to the amplifier 120' and the processor 130'.

First, the photodiode 110' may convert the optical signal received from the external device 200 into an electric signal. The description how an optical signal is converted into an electric signal by the photodiode 110' will be omitted to avoid repetition.

In addition, the photodiode 110' may transmit the converted electric signal from the first pin 111' to the processor 130'. For this, the first pin 111' of the photodiode 110' may be connected to the processor 130' on the PCB through the PCB pattern.

In addition, the photodiode 110', in response to the amplifier 120' operating, may transmit the converted electric signal from the second pin 112' to the amplifier 120'. For this, the second pin 112' of the photodiode 110' may be connected to the amplifier 120' on the PCB through the PCB pattern.

Meanwhile, the amplifier 120' may be connected to a second power source 142'. The second power source 142' may be disposed in the electronic device 100, connected to the amplifier 120' and supply a voltage required for driving the amplifier 120'. Accordingly, when a driving voltage is provided from the second power source 142' to the amplifier 120', the amplifier 120' may be driven and the converted electric signal may be transmitted from the second pin 112' to the amplifier 120'.

In addition, the third pin 113' of the photodiode 110' may be connected to the first power source 141' of the electronic device 100. Accordingly, the photodiode 110' may maintain a standby state for receiving the optical signal transmitted from the external device 200, in response to an optical signal being received, convert the optical signal into an electric signal and transmit electric signals to the processor 130' and the amplifier 120'.

As such, the photodiode 110' may have a customized PD structure where the first pin 111' and the second pin 112' which operate as output pins for transmitting the electric signals to the processor 130' and the amplifier 120', and a third pin connected to the first power source 141' for receiving a driving voltage are included.

Accordingly, the optical signal received from the external device 200 may be converted into an electric signal and the electric signal may be detected and processed only with a single photodiode 110', thereby reducing a size of the PCB and minimizing circuit configuration.

The amplifier 120' may be connected to the second pin 112' of the photodiode 110' and in response to an electric signal being received from the second pin 112' of the photodiode 110', amplify the received electric signal.

To this end, the amplifier 120' may be embodied as a Trans-Impedance Amplifier (TIA). The detailed description of the trans-impedance amplifier will be omitted to avoid repetition.

The processor 130' may receive an electric signal from the photodiode 110'. Specifically, the photodiode 110', in response to the optical signal being received from the external device 200, may convert the optical signal into an electric signal and output the converted electric signal from the first pin 111' to the processor 130'. Accordingly, the processor 130' may receive an electric signal from the first pin 111' of the photodiode 110'.

A driving voltage by the first power source 141' may not be supplied to the amplifier 120'. That is, since the amplifier 120' is not being driven, the amplifier 120' may not amplify the electric signal output from the second pin 112' of the photodiode 110' and output the electric signal to the processor 130'.

When the processor 130' receives an electric signal, the processor 130' may control the first power source 141' of the electric device 100 to supply power to the amplifier 120'.

Specifically, the processor 130', in response to the electric signal being received from the first pin 111' of the photodiode 110', may determine that the optical signal is received from the external device 200. Accordingly, the processor 130', in response to the optical signal being received from the external device 200, may control the first power source 141' to apply power to the amplifier 120' for performing signal processing of the optical signal received from the external device 200.

As such, the first pin 111' of the photodiode 110' may serve as a signal detect pin in outputting an electric signal to the processor 130' to render the processor 130' to detect the optical signal received from the external device 200.

Accordingly, when the driving voltage by the first power source 141' is applied to the amplifier 120', the amplifier 120' may amplify the electric signal output from the second pin 112' of the photodiode 110' and output the amplified electric signal to the processor 130'. Thus, a current signal may be converted into a voltage signal and the voltage signal may be transmitted to the processor 130' with an amplitude being amplified.

As such, in a state where an electric signal is not received from the first pin 111' and an electric signal is not detected by the processor 130', the second power source 142' provided to the amplifier 120' may be turned off, thereby reducing redundant power consumption in a standby mode of the electronic device 100.

Accordingly, the processor 130' may perform a function of the electronic device 100 by using the amplified electric signal.

FIG. 7 is a view provided to explain a method for transmitting, receiving and processing an optical signal according to an exemplary embodiment.

The external device 200 may transmit an optical signal to the electric device 100 through an optical cable.

To this end, the external device 200 may include a laser diode 210', a Laser Diode Driver (LDD) 220' and a Micro Controller Unit (MCU) 230'.

Specifically, the external device 200 may receive an electric signal from another external device (not shown) connected thereto.

In addition, when detecting an electric signal, the MCU 230' may provide a driving voltage to the laser diode driver 220' by controlling a power source 240' connected to the laser diode driver 220'. In addition, when a driving voltage is applied to the laser diode driver 220', the laser diode driver 220' may control the laser diode 210', for example, Vertical-Cavity Surface-Emitting Laser (VCSEL) 210'. Specifically, the laser diode driver 220' may control the VCSEL 210' for converting the received electric signal into an optical signal. Accordingly, the VCSEL 210' may convert an electric signal into an optical signal and transmit the optical signal to the electric device 100 through an optical cable.

Meanwhile, the laser diode 210', the laser diode driver 220' and the MCU 230' may transmit and receive signals by using the Inter Integrated Circuit (I2C) communication. The I2C communication may refer to communication where a Serial Clock (SCL) signal is used as a synchronization signal and data is exchanged through Serial Data (SDA).

The electronic device 100 may convert the optical signal received through the optical cable into an electric signal and process the electric signal.

To this end, as described above, the electronic device 100 may include the photodiode 110', the amplifier 120' and the processor 130'. The photodiode 110' may be connected to the first power source 141' of the electronic device 100 and receive a driving voltage. Accordingly, the photodiode 110' may use the applied voltage, receive an optical signal through an optical cable, convert the optical signal into an electric signal, and transmit the electric signal from the first pin 111' to the processor 130'.

Meanwhile, since a driving voltage by the second power 142' is not supplied to the amplifier 120', the amplifier 120' may not be driven. Accordingly, the electric signal converted by the photodiode 110' may not pass through the amplifier 120' through the second pin 112' of the photodiode 110'.

When an electric signal is transmitted from the first pin 111' of the photodiode 110' to the processor 130', the processor 130' may detect the electric signal, control the second power source 142' connected to the amplifier 120' accordingly and control to apply a driving voltage to the amplifier 120'.

In addition, when a driving voltage by the second power source 142' is applied to the amplifier 120' and the amplifier 120' is driven, the electric signal output to the second pin 112' of the photodiode 110' may flow through the amplifier 120'. Accordingly, the processor 130' may receive the electric signal amplified by flowing through the amplifier 120' from the amplifier 120'.

As described above, the photodiode 110', the amplifier 120' and the processor 130' may transmit and receive signals by using the PCB pattern.

FIG. 7 illustrates that the electronic device 100 includes the first power source 141' and the second power source 142' as additional components, but it is the convenience of explanation. It should be understood that power may be supplied to the photodiode 110' and the amplifier 120' through a single power source.

Figure 8:
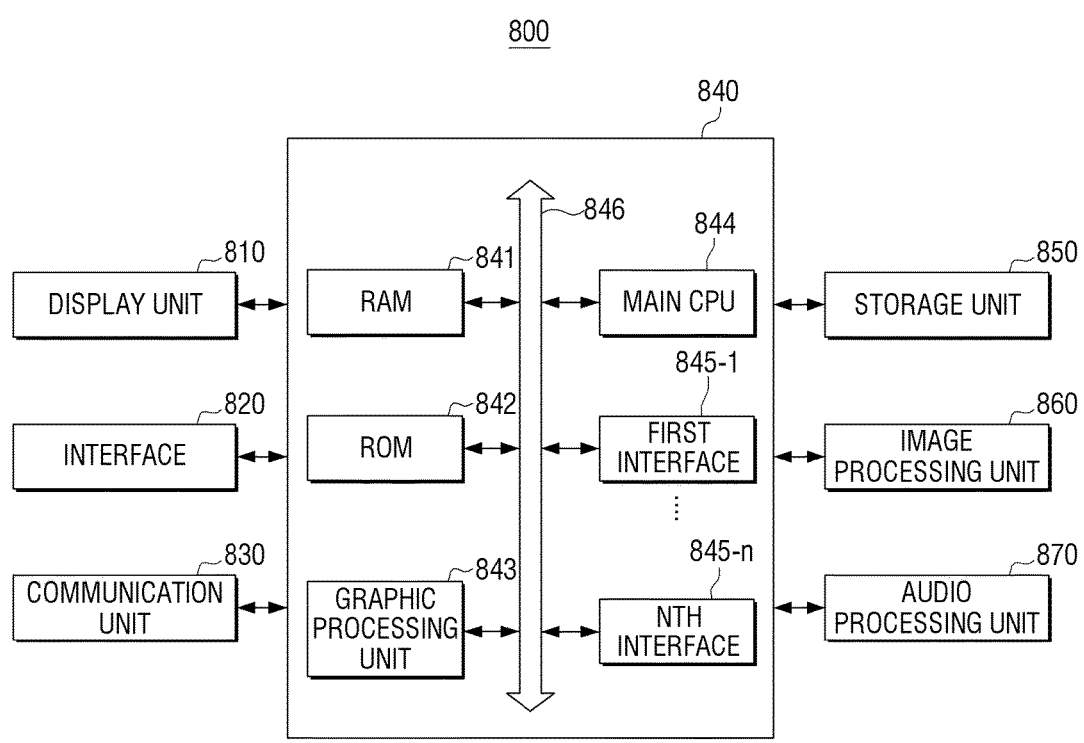
FIG. 8 is a detailed block diagram illustrating configuration of an electronic device according to an exemplary embodiment.

FIG. 8 is a detailed block diagram illustrating configuration of an electronic device according to an exemplary embodiment.

Referring to FIG. 8, an electronic device 800 according to an exemplary embodiment may include a display unit 810, interface 820, a communication unit 830, a processor 840, a storage unit 850, an image processing unit 860 and an audio processing unit 870.

The display unit 810 may display various screens. Examples of the screens may include playback screens of various contents such images, videos, texts, music, etc., application execution screens including various contents, web browser screens, Graphic User Interface (GUI) screens, and the like.

In such a case, the display unit 180 may be embodied with Liquid Crystal Display Panel (LCD), Organic Light Emitting Diodes (OLEC), etc., but the present invention is not limited thereto. In addition, the display unit 810 may be embodied with a flexible display, a transparent display, etc.

The interface 820 may receive various user commands. The interface 820 may be embodied as various forms according to an embodiment example of the electronic device 800. When the electronic device 800 is embodied as a digital TV, the interface 820 may be embodied as a remote controller receiver which receives a remote controller signal, a camera for detecting a user motion, a microphone for receiving a user voice, etc. In addition, when the electronic device 800 is embodied as a touch based-portable terminal, the interface 820 may be embodied as a touch screen which forms a mutual layer structure with a touch pad. In such a case, the interface 820 may be used as the display unit 810.

Particularly, the interface 820 may receive the optical signal transmitted from the external device 200.

Specifically, the external device 200 may convert the electric signal received from another external device into an optical signal and transmit the optical signal to the electronic device 800 when connected to another external device. In addition, the interface 820 may receive the optical signal transmitted from the external device 200 and it has been described that the interface 820 may be embodied as a photodiode.

The communication unit 830 may communicate with the external device 200 according to various types of communication methods. The communication unit 830 may include various communication chips such as a Wi-Fi chip, a Bluetooth chip, a wireless communication chip, an NFC chip, etc.

The processor 840 may control overall operations of the electronic device 800 by using various programs stored in the storage unit 850.

Specifically, the processor 840 may include a RAM 841, a ROM 842, a graphic processing unit 843, a main CPU 844, first to nth interfaces 845-1 to 845-$n$, and a bus 846.

The RAM 841, the ROM 842, the graphic processing unit 843, the main CPU 844, the first to nth interfaces 845-1 to 845-$n$ may be connected to one another through the bus 846.

The first to nth interfaces 845-1 to 845-$n$ may be connected to various constituents described above.

The main CPU 844 may access the storage unit 850 and perform booting by using O/S stored in the storage unit 850. In addition, the main CPU 844 may perform various operations by using various programs, contents, data, etc. stored in the storage unit 850.

A command set for system botting, etc. may be stored in the ROM 842. When a turn-on command is input and power is supplied, the main CPU 844 may copy the O/S stored in the storage unit 850 to the RAM 841 according to a command stored in the ROM 842, execute the O/S and boots the system.

The graphic processing unit 843 may generate a screen including various objects such as icons, images, texts, etc. by using a calculation unit (not shown) and a rendering unit (not shown). The calculation unit (not shown) may calculate an attribute value such as a coordinate value, a shape, a size, a color, etc. of each object to be displayed according to a layout of the screen based on the received control command. The rending unit (not shown) may generate a screen with various layouts including objects based on attribute values calculated by the calculation unit (not shown). The screen generated by the rendering unit (not shown) may be displayed in a display area of the display unit 810.

Figure 9:
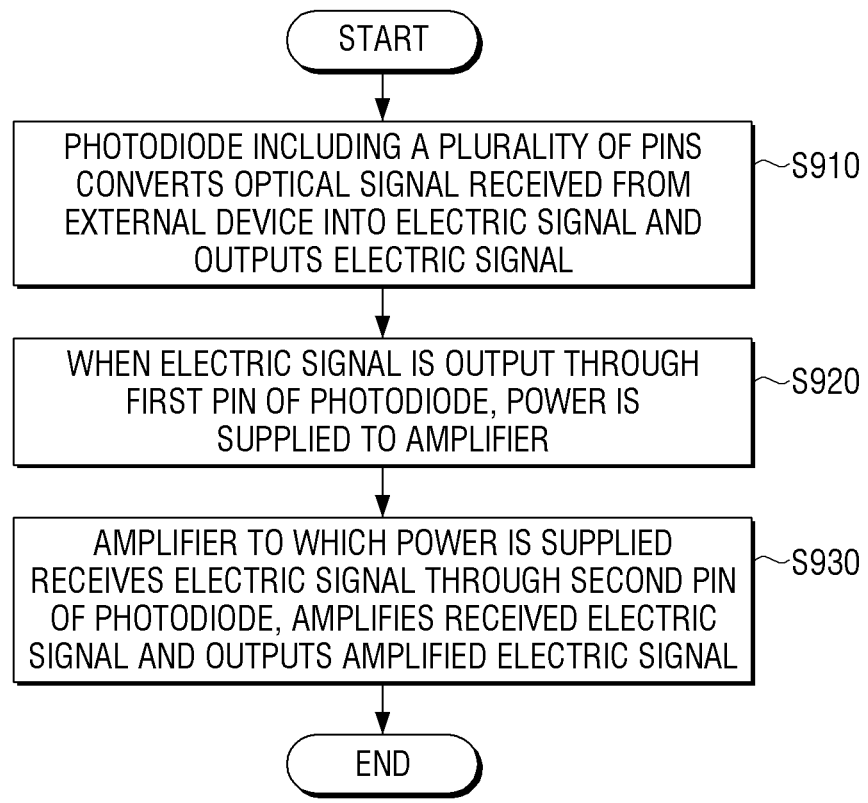
FIG. 9 is a flow chart provided to explain a process of receiving a signal from an external device and processing the signal by an electronic device according to an exemplary embodiment.

FIG. 9 is a flow chart provided to explain a process of receiving a signal from an external device and processing the signal by an electronic device according to an exemplary embodiment.

First, a signal conversion unit may convert an optical signal received from an external device into an electric signal and output the electric signal (S910). The signal conversion unit may include a first photodiode and a second photodiode or include a signal photodiode as described above. In addition, when the electric signal is output from the signal conversion unit, power is supplied to an amplifier (S920). When the power is supplied to the amplifier, the amplifier may receive the electric signal from the signal conversion unit, amplify the received electric signal and output the amplified electric signal (S930).

Meanwhile, a non-transitory computer readable medium may be provided where a program for sequentially performing receiving an optical signal and processing the received optical signal according to the present invention is stored.

The non-transitory computer readable recording medium may not store data for a short period of time such as a register, a cache, a memory, and the like, but may store data semi-permanently and be capable of being read by a device. Specifically, a program related to receiving an optical signal and processing the received optical signal described above may be stored and provided in the non-transitory computer readable medium such as a compact disc (CD), a digital versatile disk (DVD), a hard disk, a Blu-ray disk, a universal serial bus (USB), a memory card, a ROM, etc.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
   an amplifier;
   a signal conversion unit including a single photodiode, the signal conversion unit being configured to, in response to at least one optical signal being received from an external device, convert one of the received at least one optical signal into a first electric signal using the single photodiode and output the first electric signal; and
   a processor configured to receive the first electric signal output from the signal conversion unit and control to supply power to the amplifier in response to the first electric signal being received from the signal conversion unit,
   wherein the amplifier, in response to the power being supplied to the amplifier, is configured to receive a second electric signal output from the signal conversion unit, amplify the received second electric signal and output the amplified second electric signal to the processor,
   wherein the single photodiode includes first and second pins for outputting the first and second electric signals, respectively,
   wherein the first pin of the single photodiode is connected to the processor and outputs the first electric signal to the processor, and
   wherein the second pin of the single photodiode is connected to the amplifier and outputs the second electric signal to the amplifier.

2. The electronic device as claimed in claim 1, wherein the external device is a jack pack device that is connected to a plurality of other external devices, converts signals received from the plurality of other external devices into optical signals and transmits the optical signals to the electronic device through a single cable.

3. The electronic device as claimed in claim 1, further comprising:
   a display,
   wherein the processor is configured to process the second electric signal received from the amplifier and to output an image on the display.

4. The electronic device as claimed in claim 1, wherein the electronic device is connected to the external device through a transparent optical cable for transmitting the at least one optical signal.

5. The electronic device as claimed in claim 1, wherein the external device comprises a laser photodiode which converts a signal received from another external device connected to the external device into an optical signal and transmits the at least one optical signal to the single photodiode.

6. The electronic device as claimed in claim 1, wherein the external device is a jack pack device that is connected to a plurality of other external devices, converts signals received from the plurality of other external devices into the at least one optical signal and transmits the at least one optical signal to the electronic device through a single cable.

7. A method for controlling an electronic device, comprising:
   converting an optical signal received from an external device into a first electric signal and outputting the first electric signal by a signal conversion unit;
   supplying, by control of a processor, power to an amplifier in response to the first electric signal being output from the signal conversion unit; and
   receiving a second electric signal output from the signal conversion unit and amplifying and outputting the received second electric signal by the amplifier to which the power is supplied,
   wherein the signal conversion unit comprises a single photodiode including first and second pins for outputting the first and second electric signals, respectively,
   wherein the first pin of the single photodiode is connected to the processor and outputs the first electric signal to the processor, and
   wherein the second pin of the single photodiode is connected to the amplifier and outputs the second electric signal to the amplifier.

* * * * *